US012743406B1

(12) United States Patent
Meir

(10) Patent No.: US 12,743,406 B1
(45) Date of Patent: Sep. 22, 2026

(54) APPEND AND SORT ACCELERATOR

(71) Applicant: Pliops Ltd., Tel Aviv (IL)

(72) Inventor: Avraham Meir, Rishon le zion (IL)

(73) Assignee: Pliops Ltd., Tel-Aviv (IL)

(*) Notice: Subject to any disclaimer, the term of this patent is extended or adjusted under 35 U.S.C. 154(b) by 689 days.

(21) Appl. No.: 17/103,800

(22) Filed: Nov. 24, 2020

Related U.S. Application Data

(60) Provisional application No. 62/939,697, filed on Nov. 25, 2019.

(51) Int. Cl.

| | |
|---|---|
| ***G06F 16/22*** | (2019.01) |
| ***G06F 3/06*** | (2006.01) |
| ***G06F 7/36*** | (2006.01) |
| ***G06F 12/02*** | (2006.01) |
| ***G06F 16/27*** | (2019.01) |
| ***G06F 21/62*** | (2013.01) |

(52) U.S. Cl.
CPC .......... *G06F 16/2246* (2019.01); *G06F 3/067* (2013.01); *G06F 7/36* (2013.01); *G06F 12/0246* (2013.01); *G06F 16/27* (2019.01); *G06F 21/6218* (2013.01)

(58) Field of Classification Search
CPC ........ G06F 16/2246; G06F 3/067; G06F 7/36; G06F 12/0246; G06F 21/6218; G06F 16/27
USPC .......................................................... 707/797
See application file for complete search history.

(56) References Cited

U.S. PATENT DOCUMENTS 5,544,357 A * 8/1996 Huei .................... G06F 16/252 707/715
2013/0103729 A1* 4/2013 Cooney ................ G06F 16/252 707/831
2013/0275656 A1* 10/2013 Talagala ............. G06F 12/0246 711/103
2015/0016172 A1* 1/2015 Loh ...................... G06F 3/0608 365/51

(Continued)

*Primary Examiner* — Tony Mahmoudi
*Assistant Examiner* — Kamal K Dewan
(74) *Attorney, Agent, or Firm* — Reches Patents

(57) ABSTRACT

A method for performing one or more key-value pair operations, the method may include receiving, by one or more accelerators, from one or more first processors, and using an interface between the one or more first processors and the one or more accelerators, at least one request to perform the one or more key-value pair operations, wherein the one or more key-value pair operations are related to key-value pairs of one or more lists of the at least one search tree that is stored in a memory, wherein the at least one request comprises request fields that store key-value pair operation parameters, the key-value pair operation parameters comprise (i) an operand, (ii) retrieval information for retrieving from the memory the one or more lists of the at least one search tree, and at least one out of (iii) sorting method identifier, and (iv) collision handling policy identifier, generating, by the one or more accelerators, at least one response to the at least one request; sending the at least one response using the interface between the one or more first processors and the one or more accelerators; and wherein the one or more accelerators are more efficient in generating the at least one response than the one or more first processors.

16 Claims, 6 Drawing Sheets

(56) References Cited

U.S. PATENT DOCUMENTS

2016/0110292 A1* 4/2016 Choi .................. G06F 16/9014
711/216
2016/0132541 A1* 5/2016 Felch .................... G06F 9/5066
707/741
2016/0179802 A1* 6/2016 Olshanetckii ....... G06F 16/2255
707/747
2018/0165381 A1* 6/2018 Venkatesh ......... G06F 16/90339
2020/0014688 A1* 1/2020 Kohli .................... H04L 9/0891
2020/0136971 A1* 4/2020 Cohen ................... H04L 9/0643
2020/0334292 A1* 10/2020 Ganeshan ............. G06F 3/0679
2020/0334294 A1* 10/2020 Boles .................. G06F 16/9027
2020/0379775 A1* 12/2020 Kulkarni ................. G06F 16/00
2021/0064585 A1* 3/2021 Chen ..................... H04L 9/0894

* cited by examiner

Request 60

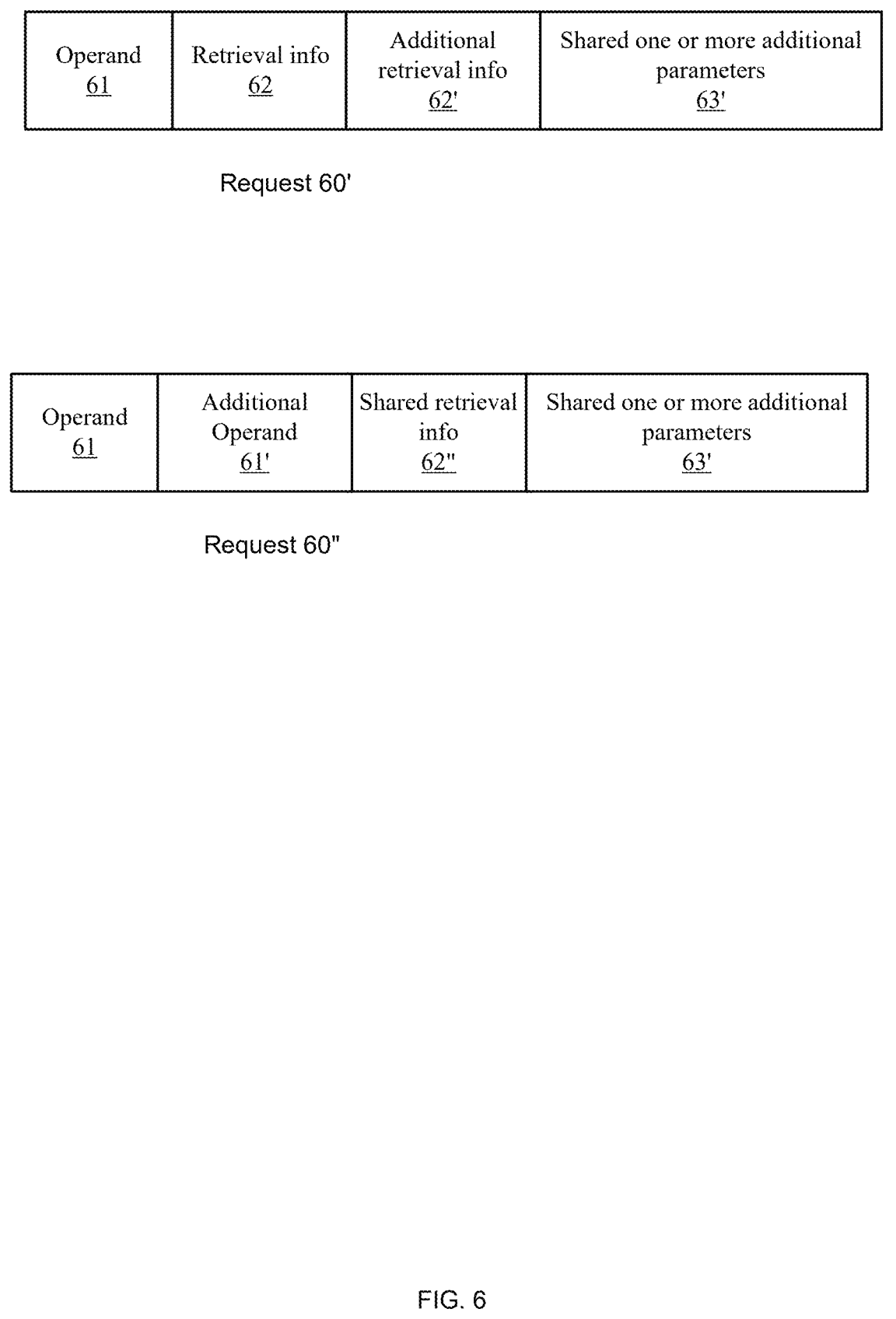

| Operand 61 | Retrieval info 62 | Additional retrieval info 62' | Shared one or more additional parameters 63' |
| --- | --- | --- | --- |

Request 60'

| Operand 61 | Additional Operand 61' | Shared retrieval info 62" | Shared one or more additional parameters 63' |
| --- | --- | --- | --- |

Request 60"

FIG. 6

APPEND AND SORT ACCELERATOR

CROSS REFERENCE

This application claims priority from U.S. provisional patent 62/939,697 filing date Nov. 25, 2019 which is incorporated herein by reference.

BACKGROUND

There is a growing need to accelerate various processed related to key value operations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 5 and 6 illustrate examples of requests.

DETAILED DESCRIPTION OF THE DRAWINGS

Figure 1:
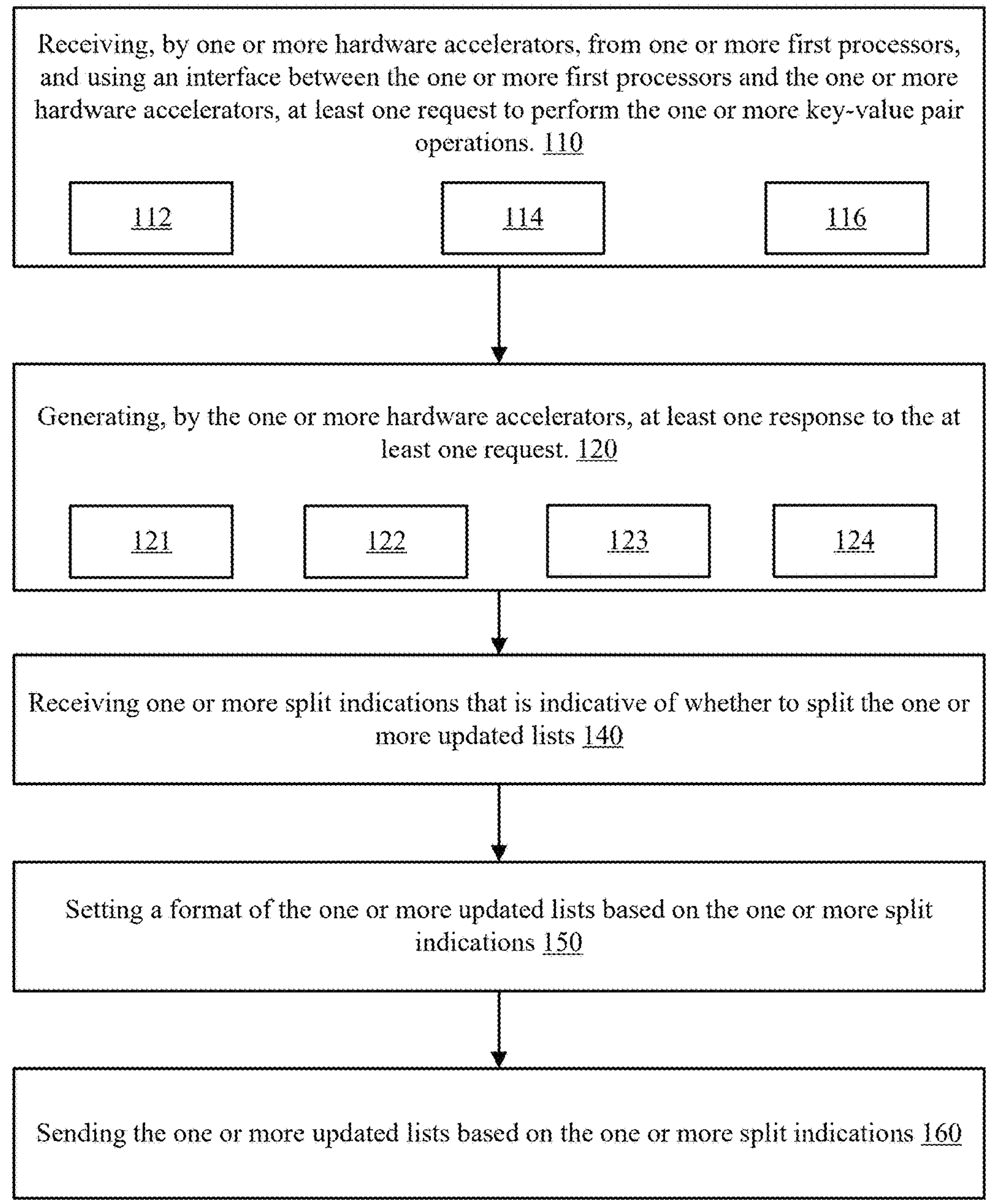
FIG. 1 illustrates a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

Key-value is a method to manage data objects in which keys are paired with data objects to form key-value pairs.

The key may be the name of the data object or any type of unique identifier—that is unique in the management environment.

The key should be relatively short (up to few KB)—and may be much shorter than the data object—that can be of any size. There are cases in which the data size is zero. For example—when the mere existence of the key is the information.

Key-Value pairs are used as an interface between database and the data-base-storage-engine.

It is used in modern applications such as Map-Reduce.

The kay value pairs may be sorted or otherwise organized according to the key.

For example—a set of Key-Value pairs may be sorted. The sorting simplifies and speed up the search after a key. The search can be done in an iterative manner.

The sorting the Key-Value pairs is performed by software that is executed by a general purpose processor such as a central processor unit (CPU) in a slow and inefficient manner.

There may be provide a system, method and a computer program product for performing various operations in a key value memory. These operations include append and sort, delete and sort and find-in-list operations or merge 2 or more lists. The list may be included in various data structures—for example in a tree structure. Other structures may be used.

The system includes one or more first processors, and one or more accelerators that interact with the first processor using an interface such as an application programming interface (API).

A first processor may be a general purpose processor (including but not limited to a CPU) such as a CPU. One or more accelerators are configured to generate at least one response (to at least one request to perform one or more key-value pair operations) than the one or more first processors.

More efficient may involve generating the at least one response at a shorter time period than the one or more first processors, generating the at least one response while using less energy than the one or more first processors, generating the at least one response at a higher throughput than the one or more first processors, or a combination thereof, and the like.

Examples of key-value pair operations include an append and sort operation, a delete and sort operation, a find-in-list operation or merge 2 lists An append & sort operation may be executed by providing an API between an at least one first processor and a one or more accelerators. The at least one first processor sends a request to the one or more accelerators to append a new Key-Value pair to a list of Key-Value pairs and return the updated sorted list of Key-Value pairs.

The request may include append and sort operation parameters such as a new Key-Value pair, retrieval information for accessing a sorted list of Key-Value pairs, and at least one out of a sorting method, a collision handling policy identifier, and an updated sorted list size parameter (such as an exact size, a size threshold, and the like).

The retrieval information may be of any kind—for example a one or more pointers.

It should be noted that the updated sorted list size parameter may be replaced by a request to provide to the at least one first processor the size of the updated sorted list. The one or more accelerators may provide the at least one first processor the size of the updated sorted list—and the at least one first processor may determine whether to split the updated sorted list—and inform the one or more accelerators how to send the updated sorted list—split or not.

The one or more accelerators may solve collisions (a collision occurs when the same key is assigned to more than two Key-Value pairs—for example—a collision between different versions of Key-Value pair in the existing list, a collision between the new Key-Value pair to one or more existing Key-Value pairs of the sorted list). When there is a collision between different versions of Key-Value pair in the existing list then the collision handling policy identifier may select one of the colliding Key-Value pairs based on time (oldest version, newest version, one or more versions within a time period), and the like.

The one or more accelerators may send, using the API, a response that includes the updated sorted list. The updated sorted list may be provided in one or more iterations. For example—if the updated sorted list is too large—for example exceeds a size threshold—it may be split.

It should be noted that the one or more accelerators may operate in parallel and may execute multiple append and sort operations in parallel—when operating on different sorted lists or different part of the lists. The different sorted lists may be, for example, independent parts of a tree. The parts are independent in the sense that an append and sort operation applied on one sorted list may be executed regardless of an outcome of a concurrent append and sort operation applied on another (independent) sorted list.

The execution of one or more append and sort operations in parallel may be triggered by one or more requests. For example—each request may include append and sort operation parameters related to a single append and sort operation.

Yet for another example—a single request may include append and sort operation parameters related to more than a single append and sort operation.

At least some of the append and sort operation parameters may be shared between two or more append and sort operations. For example—sorting method, a collision handling policy identifier, and an updated sorted list size parameter. In this case—a request related to the two or more append and sort operations may include a single instance of the shared append and sort operation parameters. Alternatively—even the shared append and sort operation parameters may duplicated—one per append and sort operation.

A delete & sort operation may be executed by providing the API between the at least one first processor and the one or more accelerators.

The at least one first processor sends a request to the one or more accelerators to delete an existing Key-Value pair from a list of Key-Value pairs and return the updated sorted list of Key-Value pairs.

The request may include retrieval information for accessing a sorted list of Key-Value pairs, and at least one out of a sorting method, a collision handling policy identifier, and an updated sorted list size parameter (such as an exact size, a size threshold, and the like).

The one or more accelerators may solve collisions.

The one or more accelerators may send, using the API, a response that includes the updated sorted list. The updated sorted list may be provided in one or more iterations. For example—if the updated sorted list is too small—for example below a size threshold—it may be merged with other lists.

It should be noted that the updated sorted list size parameter may be replaced by a request to provide to the at least one first processor the size of the updated sorted list. The one or more accelerators may provide the at least one first processor the size of the updated sorted list—and the at least one first processor may determine whether to merge the updated sorted list to other list—and inform the one or more accelerators how to send the updated sorted list—merged or not.

It should be noted that the one or more accelerators may operate in parallel and may execute multiple delete and sort operations in parallel—when operating on different sorted lists or different parts of the same list. The different sorted lists may be, for example, independent parts of a tree. The parts are independent in the sense that a delete and sort operation applied on one sorted list may be executed regardless of an outcome of a concurrent delete and sort operation applied on another (independent/partial) sorted list.

The execution of one or more delete and sort operations in parallel may be triggered by one or more requests. For example—each request may include delete and sort operation parameters related to a single delete and sort operation.

Yet for another example—a single request may include delete and sort operation parameters related to more than a single delete and sort operation.

At least some of the delete and sort operation parameters may be shared between two or more delete and sort operations. For example—sorting method, a collision handling policy identifier, and an updated sorted list size parameter. In this case—a request related to the two or more delete and sort operations may include a single instance of the shared delete and sort operation parameters. Alternatively—even the shared delete and sort operation parameters may duplicated—one per delete and sort operation.

A find-in-list operation may be executed by providing an API between the at least one first processor and the one or more accelerators. The at least one first processor sends a request to the one or more accelerators to find (in a sorted list of Key-Value pairs) a certain Key-Value pair that has a certain key.

The request may include retrieval information for accessing the sorted list of Key-Value pairs, and at least one out of a sorting method, and a collision handling policy identifier.

The one or more accelerators may solve collisions (i.e. selecting between few same key-value pairs).

The one or more accelerators may send, using the API, a response that includes location information about a location of the Key-Value pair and/or an indication that the Key-Value pair does not include in the sorted list.

The location information may include retrieval information for retrieving the Key-Value pair.

One or more dedicated values of the location information may be used as a failure indicator—and may be dedicated to indicate that the Key-Value pair is not included in the sorted list of Key-Value pairs, It should be noted that the one or more accelerators may operate in parallel and may execute multiple find-in-list operations in parallel—when operating on different sorted lists. The different sorted lists may be, for example, independent parts of a tree. The parts are independent in the sense that a find-in-list operation applied on one sorted list may be executed regardless of an outcome of a concurrent find-in-list operation applied on another list.

The execution of one or more find-in-list operations in parallel may be triggered by one or more requests. For example—each request may include find-in-list operation parameters related to a single find-in-list operation.

Yet for another example—a single request may include find-in-list operation parameters related to more than a single find-in-list operation.

At least some of the find-in-list operation parameters may be shared between two or more find-in-list operations. For example—sorting method, a collision handling policy identifier, and an updated sorted list size parameter. In this case—a request related to the two or more find-in-list operations may include a single instance of the shared find-in-list operation parameters. Alternatively—even the shared find-in-list operation parameters may duplicated—one per find-in-list operation.

The one or more accelerators may manage the order of execution requests, alternatively—the one or more first processors may manage the order of execution of requests. Yet for another example—the order of execution of the requests may be determined by both the one or more accelerators and the one or more first processors.

Requests may be buffered, executed in order, executed out of order, the one or more accelerators may allocate requests between the one or more accelerators based on one or more parameters such as priority, load balancing, or any arbitration or selection rule.

FIG. 1 illustrates method 100 for performing one or more key-value pair operations.

Method 100 may include step 110 of receiving, by one or more accelerators, from one or more first processors, and using an interface between the one or more first processors and the one or more accelerators, at least one request to perform the one or more key-value pair operations.

The one or more key-value pair operations are related to key-value pairs (single key-value or list of key-value) of one or more lists stored in a memory.

The at least one request may include request fields that store key-value pair operation parameters, the key-value pair operation parameters may include (i) an operand, (ii) retrieval information for retrieving from the memory the one or more lists, and at least one out of (iii) sorting method identifier, and (iv) collision handling policy identifier.

The one or more accelerators are more efficient in generating the at least one response than the one or more first processors.

Step 110 may include step 112 of receiving a single request that is for executing a key-value pair operation on two or more lists of the multiple lists. The single request may be a compressed request that has a single instance of shared key-value pair operation parameters. Alternatively—the request may be uncompressed and includes an instance of the shared key-value pair operation parameters for each list.

Step 110 may include step 114 of receiving a single request that is for executing multiple key-value pair operations on a single list. The single request may be a compressed request that comprises of a single instance of shared key-value pair operation parameters.

Alternatively—the request may be uncompressed and includes an instance of the shared key-value pair operation parameters for each key-value pair operation.

The one or more lists may be one or more sorted lists, and the one or more updated lists may be one or more updated sorted lists.

Step 110 may include step 116 of receiving a request that includes an operand field, one or more retrieval information fields and additional fields for storing the at least one out of the sorting method identifier, and the collision handling policy identifier.

Step 110 may be followed by step 120 of generating, by the one or more accelerators, at least one response to the at least one request.

Step 120 may include sending the at least one response using the interface between the one or more first processors and the one or more accelerators.

The key-value pair operation parameters may also include an updated list size parameter.

The at least one response may include one or more updated lists.

Step 120 may include step 121 of determining, based on one or more updated list size parameters related to the one or more updated lists, whether to split at least one of the one or more updated lists, and step 122 of generating the at least one response according to the determination.

For example—if an updated sorted list exceeds a size threshold (for example a maximal allowed size threshold)—the updated list may be split—and different parts of the updated list will be outputted at different times using the interface. Yet for another example—when an updated sorted list is below a minimal size threshold it may be required to merge the list.

Step 120 may include step 123 of comprises calculating size information indicative of a size of each one of the one or more updated lists.

Step 123 may be followed by step 124 (included in step 120) of sending the size information.

Step 120 may be followed by step 140 of receiving one or more split/merge indications that is indicative of whether to split the one or more updated lists or margining with other lists.

Step 140 may be followed by step 150 of setting a format of the one or more updated lists based on the one or more split/merge indications.

Step 150 may be followed by step 160 of sending the one or more updated lists based on the one or more split/merge indications.

The one or more key-value pair operations may be multiple key-value pair operations and step 120 may include step 140 of generating multiple responses in parallel.

Figure 2:
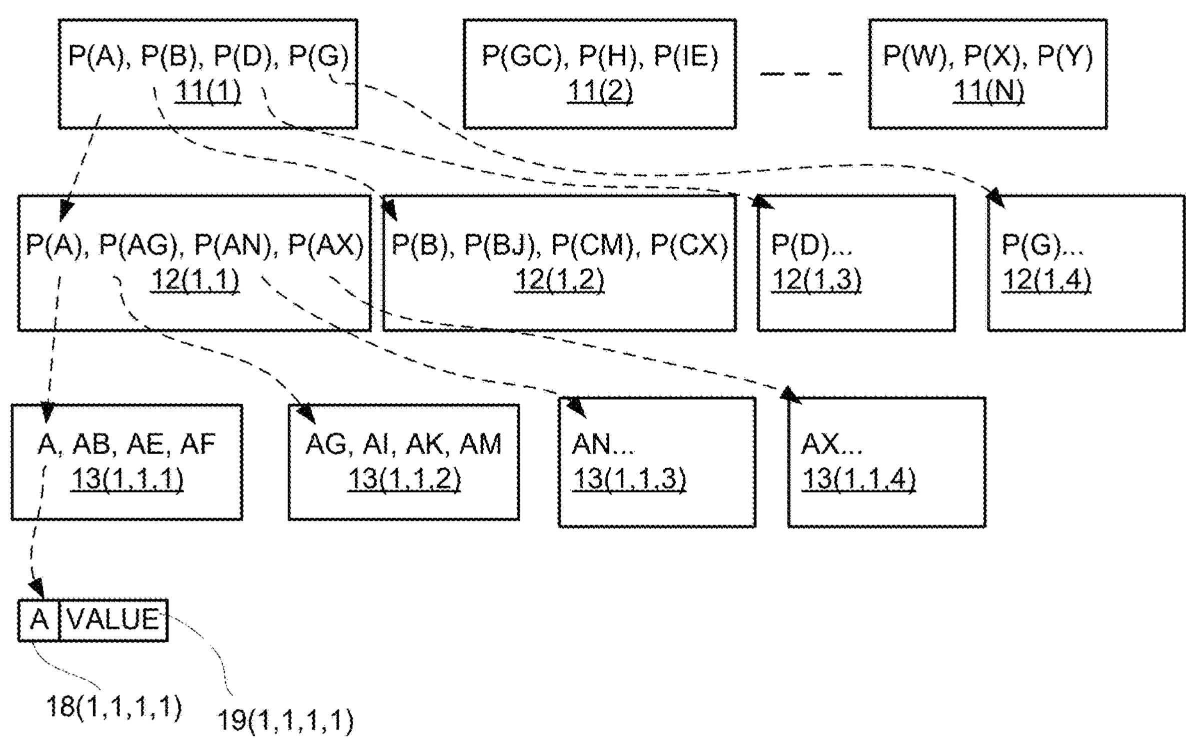
FIG. 2 illustrates a data structure.

FIG. 2 illustrates a three-layered data structure 10 that forms a search tree.

The first layer include pointers to pointers of the second layer, and the second layer includes pointers to the key value pairs.

For example the first layer includes N first layer sets of pointers 11(1)-11(N). The first layer first set of pointers includes pointers to the beginning of second layer pointers. The first layer first set of pointers 11(1) includes pointers P(A), P(B), P(D) and P(G). The first layer second set of pointers 11(2) includes pointers P(GC), P(H) and P(IE). The first layer N'th set of pointers 11(N) includes pointers P(W), P(X) and P(Y).

The second layer is illustrated as including pointers to key value pairs. For simplicity of explanation only four sets of second layer pointers (pointed by first set 11(1)) are shown.

The second layer first set of pointers 12(1) includes pointers P(A), P(AG), P(AN) and P(AX). The second layer second set of pointers 12(2) includes pointers P(B), P(BJ), P(CM) and P(CX). The second layer third set of pointers 12(3) starts by pointer P(D) (other pointers are not shown for simplicity of explanation). The second layer fourth set of pointers 12(4) starts by pointer P(G) (other pointers are not shown for simplicity of explanation).

The third layer includes key-value pairs (such as a key value pair of key A 18(1,1,1,1) and value 19(1,1,1,1)—but only the keys are shown for simplicity of explanation. The key values pairs may be arranged as a search tree.

The third layer includes lists of key value pairs—such first list 13(1,1,1)—includes key-value pairs having keys of A, AB, AE and AF, second list 13(1,1,2) that includes key-value pairs having keys of AG, AI, AK, and AM, third list(13,1,3) that starts with a key-value pair having key AN (other key-value pairs are not shown for simplicity of explanation), and fourth list(13,1,4) that starts with a key-value pair having key AX (other key-value pairs are not shown for simplicity of explanation).

The third layer includes additional lists—but these are not shown for simplicity of explanation.

Figure 3:
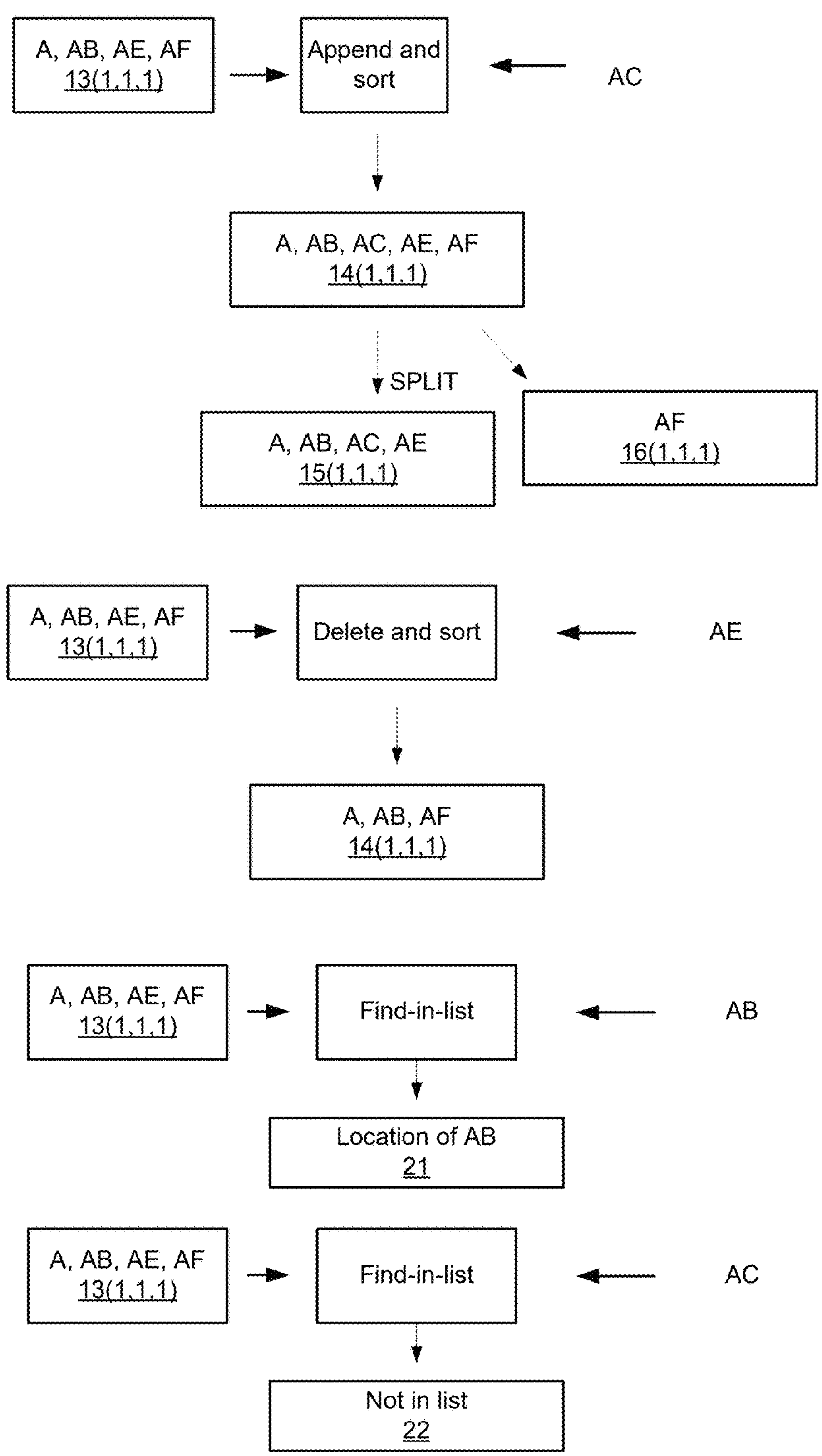
FIG. 3 illustrates examples three key-value pair operations.

FIG. 3 illustrates various key-value pair operations.

Starting from top to bottom—the first key-value pair operation is an append and sort operation in which key-value pair of key AC is added to first list 13(1,1,1), by applying an append and sort operation to provide an updated sorted list 14(1,1,1) that includes key-value pairs having keys of A, AB, AC, AE and AF. The updated sorted list can be outputted at a single iteration—or be split (for example to first part 15(1,1,1,) and second part 16(1,1,1)—based on a size parameter—such as a maximal size of four key-value pairs.

The second key-value pair operation is a delete and sort operation in which key-value pair of key AE is deleted from first list 13(1,1,1), by applying a delete and sort operation to provide an updated sorted list 14(1,1,1) that includes key-value pairs having keys of A, AB and AF.

The third key-value pair operation is a find-in-list operation in which key-value pair of key AB is searched in the first list 13(1,1,1)—and its location is outputted.

Figure 4:
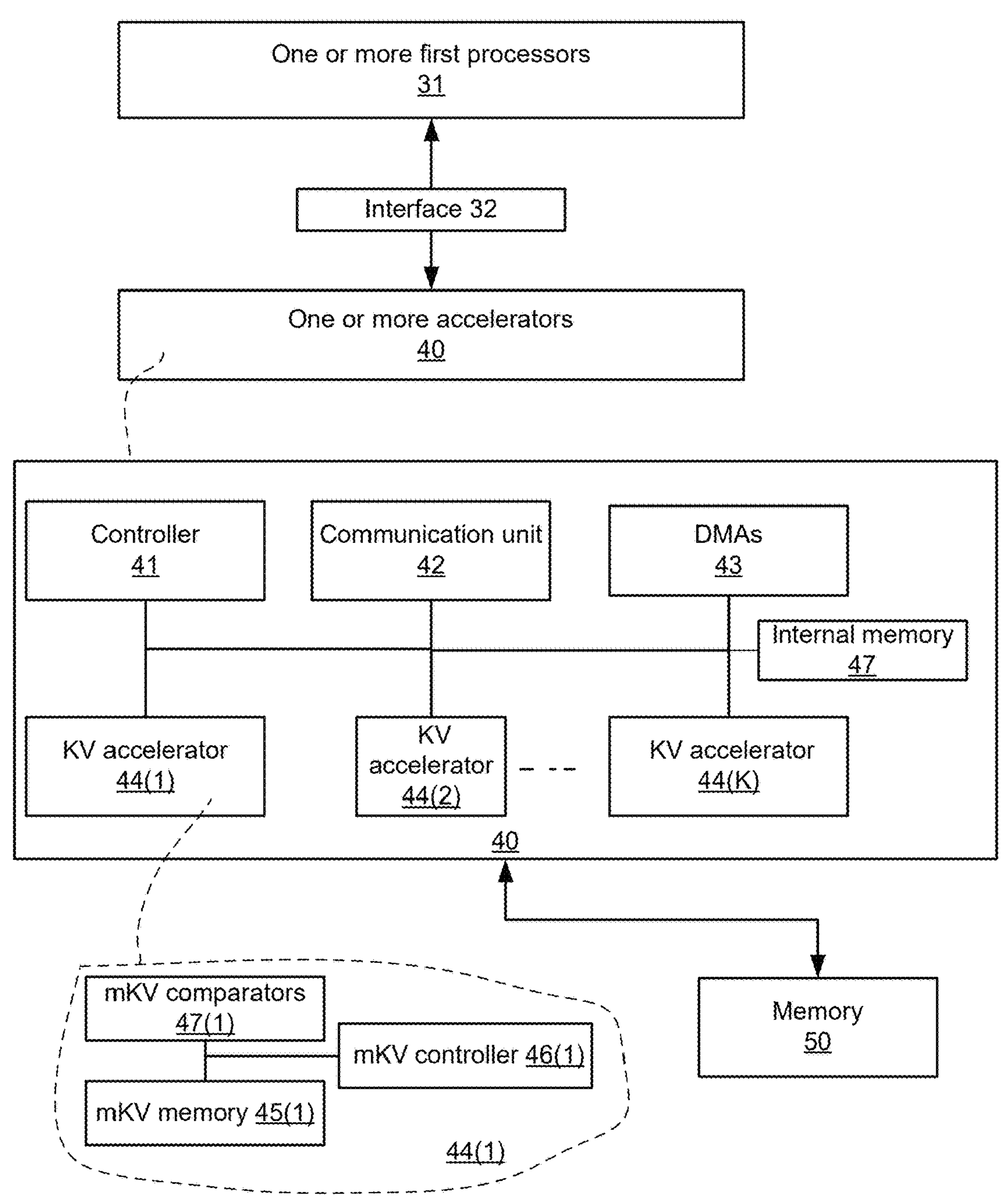
FIG. 4 illustrates an example of one or more first processors and one or more accelerators.

FIG. 4 illustrates one or more accelerators 40, one or more first processors 31 and interface 32 between the one or more accelerators 40 and the one or more first processors 31.

The one or more accelerators 40—for example K accelerators, are coupled to an internal memory 47, communication unit 42 and direct memory access units (DMAs) 43 and a controller 41 (for controlling the accelerators 40, the internal memory 47, communication unit 42 and the DMAs 43). K is a positive integer that exceeds two.

An external memory (for example DDR) may be accessed by the DMAs. A accelerator 40 may operate on multiple keys at one cycle and may include sub-systems (denoted "KV accelerators 44(1)-44(K)), each my include mKV-comparators 47(1), mKV-controller 46(1) and mKV memory 45(1). "m" stands for micro.

Figure 5:
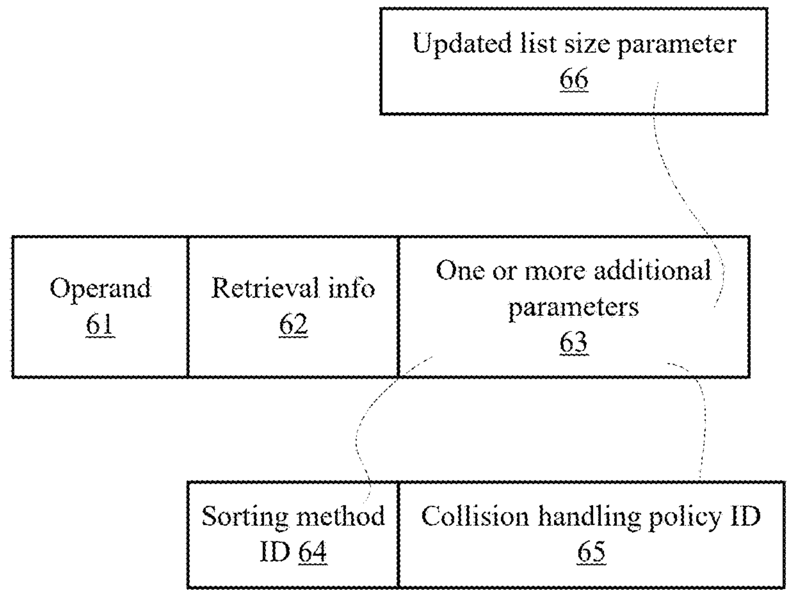

FIGS. 5 and 6 illustrates example of formats of requests. It should be noted that the number of fields and their content may differ from those illustrated in FIGS. 5 and 6.

In FIG. 5 a request 60 is for a single key-value pair operation and include an operand (61) indicating the type of operation to execute—for example append and sort, delete and sort of find-in-list), retrieval information ("retrieval info 62") for retrieving one or more lists of key-value pairs and one or more additional parameter such one or more out of sorting method identifier ("sorting method ID 64"), collision handling policy identifier ("collision handling policy ID" 65), and updated list size parameter 66.

FIG. 6 illustrates examples of request 60' and request 60" both include shared one or more additional parameters.

Request 60' is for executing a single key-value pair operation (rather two instances of the same key-value pair operation) on two different lists—thus include retrieval info 62 and additional retrieval info 62'. Any parameter that may be shared between the two instances may appear once (as shown in FIG. 6) as a shared one or more additional parameters 63'—or may appear twice in request 60'.

Request 60" is for executing two key-value pair operations on a same list—thus include operand 61 and additional operand 61'. Any parameter that may be shared between the two key-value pair operations may appear once (as shown in FIG. 6) as a shared one or more additional parameters 63'—or may appear twice in request 60".

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for performing one or more key-value pair operations, the method comprises:

receiving, by one or more accelerators, from one or more first processors, and using an interface between the one or more first processors and the one or more accelerators, at least one request to perform the one or more key-value pair operations, wherein the one or more first processors and the one or more accelerators comprise one or more integrated circuits;

wherein the one or more key-value pair operations are selected out of an append and sort operation and a delete and sort operations and are related to key-value pairs of one or more lists stored in a memory, wherein the at least one request comprises request fields that store key-value pair operation parameters, the key-value pair operation parameters comprise (i) an operand, (ii) retrieval information for retrieving from the memory the one or more lists, and at least one out of (iii) sorting method identifier, and (iv) collision handling policy identifier, wherein different values of the collision handling policy identifier are associated with different selection rules for selecting a key value pair of colliding key value pairs;

generating, by the one or more accelerators, at least one response to the at least one request;

sending the at least one response using the interface between the one or more first processors and the one or more accelerators;

wherein the one or more accelerators are more efficient in generating the at least one response than the one or more first processors;

wherein the different selection rules are selected out of selecting an oldest version of a key value pair out of colliding versions of the key value pair, selecting a newest version of the key value pair out of colliding versions of the key value pair, or selecting a version of a key value pair within a given time period; and wherein each request of the at least one request comprises an operand field, one or more retrieval information fields and additional fields for storing the at least one out of the sorting method identifier, and the collision handling policy identifier.

2. The method according to claim 1 wherein the key-value pair operation parameters further comprises an updated list size parameter.

3. The method according to claim 2 wherein the at least one response comprises one or more updated lists.

4. The method according to claim 3 wherein the generating of the at least one response comprises determining, based on one or more updated list size parameters related to the one or more updated lists, whether to split at least one of the one or more updated lists.

5. The method according to claim 3 wherein the generating of the at least one response comprises calculating size information indicative of a size of each one of the one or more updated lists; wherein the sending comprises sending the size information; wherein the method further comprises receiving one or more split indications that is indicative of whether to split the one or more updated lists, and sending the one or more updated lists based on the one or more split indications.

6. The method according to claim 1 wherein one or more key-value pair operations are multiple key-value operations, wherein the at least one response is multiple responses, wherein the generating comprises generating the multiple responses in parallel.

7. The method according to claim 1 wherein the one or more lists comprise multiple lists, wherein a single request is for executing a key-value pair operation on two or more lists of the multiple lists, wherein the single request is a compressed request that comprises a single instance of shared key-value pair operation parameters.

8. The method according to claim 1 wherein a single request is for executing multiple key-value pair operations a single lists of the one or more list, wherein the single request is a compressed request that comprises of a single instance of shared key-value pair operation parameters.

9. The method according to claim 1 wherein the one or more lists are one or more sorted lists, and the one or more updated lists are one or more updated sorted lists.

10. The method according to claim 1 wherein the one or more lists are multiple lists that belong to different tree structures.

11. A key-value pair operations device that comprises one or more accelerators, wherein the one or more accelerators are configured to receive, from one or more first processors, and using an interface between the one or more first processors and the one or more accelerators, at least one request to perform the one or more key-value pair operations, wherein the one or more first processors and the one or more accelerators comprise one or more integrated circuits;

wherein the one or more key-value pair operations are selected out of an append and sort operation and a delete and sort operations and are related to key-value pairs of one or more lists stored in a memory, wherein the at least one request comprises request fields that store key-value pair operation parameters, the key-value pair operation parameters comprise (i) an operand, (ii) retrieval information for retrieving from the memory the one or more lists of the at least one search tree, and at least one out of (iii) sorting method identifier, and (iv) collision handling policy identifier, wherein different values of the collision handling policy identifier are associated with different selection rules for selecting a key value pair of colliding key value pairs;

generate at least one response to the at least one request; and participate in sending the at least one response using the interface between the one or more first processors and the one or more accelerators;

wherein the one or more accelerators are more efficient in generating the at least one response than the one or more first processors;

wherein the different selection rules are selected out of selecting an oldest version of a key value pair out of colliding versions of the key value pair, selecting a newest version of the key value pair out of colliding versions of the key value pair, or selecting a version of a key value pair within a given time period; and wherein each request of the at least one request comprises an operand field, one or more retrieval information fields and additional fields for storing the at least one out of the sorting method identifier, and the collision handling policy identifier.

12. A non-transitory computer readable medium that stores instructions for:

receiving, by one or more accelerators, from one or more first processors, and using an interface between the one or more first processors and the one or more accelerators, at least one request to perform one or more key-value pair operations, wherein the one or more first processors and the one or more accelerators comprise one or more integrated circuits;

wherein the one or more key-value pair operations are selected out of an append and sort operation and a delete and sort operations and are related to key-value pairs of one or more lists stored in a memory, wherein the at least one request comprises request fields that store key-value pair operation parameters, the key-value pair operation parameters comprise (i) an operand, (ii) retrieval information for retrieving from the memory the one or more lists, and at least one out of (iii) sorting method identifier, and (iv) collision handling policy identifier, wherein different values of the collision handling policy identifier are associated with different selection rules for selecting a key value pair of colliding key value pairs;

generating, by the one or more accelerators, at least one response to the at least one request;

sending the at least one response using the interface between the one or more first processors and the one or more accelerators;

wherein the one or more accelerators are more efficient in generating the at least one response than the one or more first processors;

wherein the different selection rules are selected out of selecting an oldest version of a key value pair out of colliding versions of the key value pair, selecting a newest version of the key value pair out of colliding versions of the key value pair, or selecting a version of a key value pair within a given time period; and wherein each request of the at least one request comprises an operand field, one or more retrieval information fields and additional fields for storing the at least one out of the sorting method identifier, and the collision handling policy identifier.

13. The non-transitory computer readable medium according to claim 12 wherein the key-value pair operation parameters further comprises an updated list size parameter.

14. The non-transitory computer readable medium according to claim 12 wherein one or more key-value pair operations are multiple key-value operations, wherein the at least one response is multiple responses, wherein the generating comprises generating the multiple responses in parallel.

15. The non-transitory computer readable medium according to claim 12 wherein the one or more lists comprise multiple lists, wherein a single request is for executing a key-value pair operation on two or more lists of the multiple lists, wherein the single request is a compressed request that comprises a single instance of shared key-value pair operation parameters.

16. The non-transitory computer readable medium according to claim 12 wherein a single request is for executing multiple key-value pair operations a single lists of the one or more list, wherein the single request is a compressed request that comprises of a single instance of shared key-value pair operation parameters.

* * * * *